(12) United States Patent
Joseph et al.

(10) Patent No.: US 12,338,729 B2
(45) Date of Patent: Jun. 24, 2025

(54) INDICATING POSITION OF A MOVING MECHANISM OF WELL SITE TOOLS

(71) Applicant: Halliburton Energy Services, Inc., Houston, TX (US)

(72) Inventors: Joseph Chakkungal Joseph, The Woodlands, TX (US); Ravi Sharad Vayeda, Spring, TX (US); Ziquan Wang, Houston, TX (US); Paul Gregory James, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 97 days.

(21) Appl. No.: 17/836,869

(22) Filed: Jun. 9, 2022

(65) Prior Publication Data

US 2022/0316322 A1 Oct. 6, 2022

Related U.S. Application Data

(62) Division of application No. 16/674,113, filed on Nov. 5, 2019, now Pat. No. 11,359,481.

(51) Int. Cl.
*E21B 47/09* (2012.01)
*F16K 37/00* (2006.01)

(52) U.S. Cl.
CPC .......... *E21B 47/09* (2013.01); *F16K 37/0041* (2013.01)

(58) Field of Classification Search
CPC .............................. E21B 47/09; F16K 37/0041
See application file for complete search history.

(56) References Cited

U.S. PATENT DOCUMENTS

| 5,691,813 A | 11/1997 | Wood |
| 6,965,709 B1 | 11/2005 | Weiss |
| 7,049,622 B1 | 5/2006 | Weiss |
| 8,115,693 B2* | 2/2012 | Salsman ................ H01Q 1/247 |
| | | 343/703 |
| 8,695,728 B2* | 4/2014 | Trinh ..................... G01V 5/125 |
| | | 175/50 |
| 8,907,263 B2 | 12/2014 | Ohno |
| 9,261,612 B2* | 2/2016 | Inanc ....................... G01V 5/08 |

(Continued)

FOREIGN PATENT DOCUMENTS

EP 0454975 A2 11/1991

*Primary Examiner* — David Z Huang
*Assistant Examiner* — Jean F Morello
(74) *Attorney, Agent, or Firm* — Scott Richardson; Parker Justiss, P.C.

(57) ABSTRACT

This disclosure presents an apparatus to improve the position sensing of a moving mechanism, such as a fluid valve located within a borehole. The apparatus can utilize a light beam or an optical fiber to measure changes in the position sensor. The smaller and lighter apparatus can improve the accuracy of the sensing mechanism. In addition, three systems are presented. The first system utilizes a vibration sensor, such as a MEMS, and an accelerometer to calculate changes in the mechanism position of the moving mechanism. The second system utilizes a radiation source and detector combination, along with a moving radiation shield to provide more accurate position sensing than conventional techniques. In addition, a lens-based system is presented, that when combined with a radiation source, can calculate position information by detecting the diffusion or dispersal of the radiation against a radiation detector.

18 Claims, 7 Drawing Sheets

(56) References Cited

U.S. PATENT DOCUMENTS

| | | |
|---|---|---|
| 9,593,942 B2 | 3/2017 | Friend et al. |
| 9,939,551 B2 | 4/2018 | Levitt et al. |
| 2004/0150357 A1* | 8/2004 | Endo ................... H02P 8/08 |
| | | 318/114 |
| 2004/0163809 A1 | 8/2004 | Mayeu et al. |
| 2004/0194958 A1 | 10/2004 | Mayeu et al. |
| 2008/0211522 A1 | 9/2008 | Mohr et al. |
| 2012/0090379 A1* | 4/2012 | Jensen ................ G01N 21/314 |
| | | 73/28.04 |
| 2013/0255786 A1* | 10/2013 | Nakai ................... G01B 11/14 |
| | | 137/1 |
| 2013/0305825 A1 | 11/2013 | Comparetto et al. |
| 2014/0185056 A1 | 7/2014 | Dekate et al. |
| 2016/0025765 A1* | 1/2016 | Panther ............. F16K 37/0041 |
| | | 702/150 |
| 2017/0212272 A1 | 7/2017 | Monteiro et al. |
| 2017/0234114 A1 | 8/2017 | du Castel et al. |
| 2017/0321539 A1* | 11/2017 | Hawkinson ............ E21B 47/09 |
| 2018/0051700 A1 | 2/2018 | Sheth et al. |
| 2018/0171751 A1* | 6/2018 | Watson .................. E21B 34/10 |

* cited by examiner

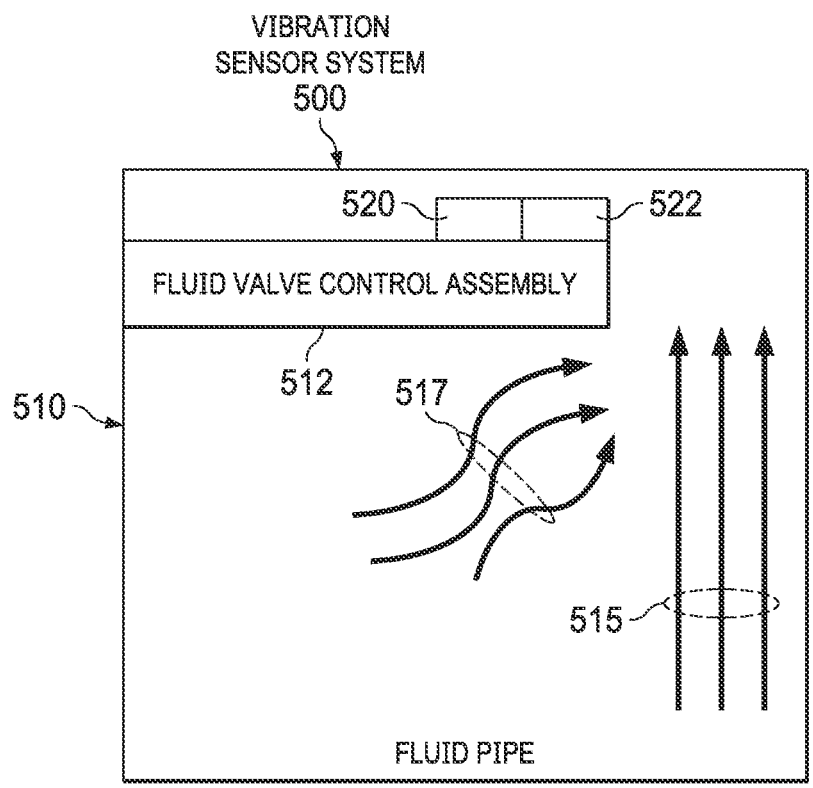
FIG. 5
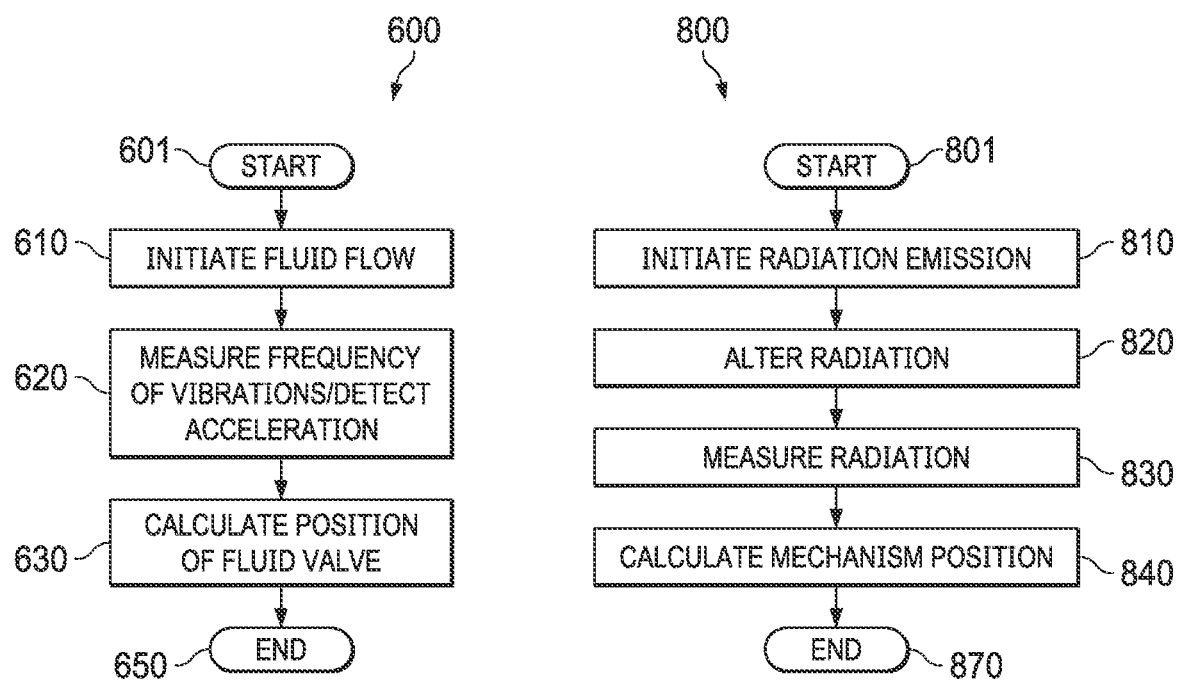
FIG. 6
FIG. 8

INDICATING POSITION OF A MOVING MECHANISM OF WELL SITE TOOLS

CROSS-REFERENCE TO RELATED APPLICATION

This application is a divisional of U.S. patent application Ser. No. 16/674,113, entitled "INDICATING POSITION OF A MOVING MECHANISM OF WELL SITE TOOLS", filed on Nov. 5, 2019. The above-listed application is commonly assigned with the present application and is incorporated herein by reference as if reproduced herein in its entirety.

TECHNICAL FIELD

This application is directed, in general, to indicating a position of a moving mechanism and, more specifically, to measure and verify the position of well site tools.

BACKGROUND

Hydrocarbon well systems can have many moving mechanisms and being able to precisely position the mechanisms can increase efficiency and lower time and costs. For example, a fluid valve can be a moving mechanism located downhole in a borehole and may be opened and closed to control the intake or outflow of various borehole fluids. Knowing the position, e.g., the exact amount the fluid valve is opened, of the fluid valve can be beneficial. Other moving mechanisms can be bent subs and shifting tools, as well as other well system tools that have precise position requirements.

Conventional position measuring devices, such as position sensor assemblies (PSA), utilize magnets to couple the PSA to part of the fluid valve system, such as the valve magnetic assembly (VMA). Some PSA magnet systems can result in a loss of precision and calibration of the positioning information due to friction and magnetic hysteresis that interfere with the smooth movement of the positioning sensor.

It is common for the moving mechanism to be fully moved to one position, such as fully closing the fluid valve, to calibrate the moving mechanism with the PSA. This periodic calibration can result in a loss of time and, prior to re-calibration, an imprecision of positioning, such as too much or too little fluid moving through the fluid valve compared to the operational plan. Being able to measure and verify the position of the moving mechanism with increased accuracy, and fewer re-calibration intervals, would be beneficial.

SUMMARY

The disclosure provides an apparatus to calculate a mechanism position of a moving mechanism of a well site tool in a well system. In one example, the apparatus includes (1) a position sensor assembly (PSA) housing capable to produce optical radiation, and to detect a reflection of the optical radiation, and (2) a PSA sub-assembly, magnetically coupled to the moving mechanism and capable to reflect the optical radiation.

The disclosure also provides a method to calculate a mechanism position of a moving mechanism of a well site tool in a well system. In one example, the method includes (1) initiating an optical radiation generated in a PSA housing, (2) measuring a reflected optical radiation as reflected by a PSA sub-assembly wherein the PSA sub-assembly is coupled to and moves proportionally to the moving mechanism, and (3) calculating, using the measuring, the mechanism position of the moving mechanism relative to a calibration position.

The disclosure further provides a system to calculate a mechanism position of a moving mechanism of a well site tool in a well system. In one example, the system includes (1) a position calculator, capable to calculate the mechanism position of the moving mechanism relative to a calibration position utilizing a movement measurement of the moving mechanism, and (2) a movement sensor, capable to communicate with the position calculator and to obtain the movement measurement utilizing one or more of a vibration sensor, an accelerometer, and a radiation detector.

The disclosure additionally provides a method to calculate a mechanism position of a fluid valve of a well site tool in a well system. In one example, the method includes (1) initiating a fluid flow through the fluid valve, wherein a sensor is attached to the fluid valve, (2) measuring a data parameter using the sensor, and (3) calculating the mechanism position of the fluid valve relative to a calibration position using the measuring, wherein the sensor is one or more of a vibration sensor and an accelerometer, and the data parameter is one or more of a frequency of vibration, a time interval, and an acceleration.

The disclosure further provides a method to calculate a mechanism position of a moving mechanism of a well site tool in a well system. In one example, the method includes (1) initiating radiation generated by a radiation source, wherein the radiation source is attached to a non-moving part of the well site tool proximate a first side of the moving mechanism, (2) altering the radiation using a radiation modifier that is coupled to the moving mechanism, (3) measuring the radiation received at a radiation detector, wherein the radiation detector is attached to a non-moving part of the well site tool proximate a second side of the moving mechanism, and (4) calculating the mechanism position of the moving mechanism relative to a calibration position using the measuring.

BRIEF DESCRIPTION

Reference is now made to the following descriptions taken in conjunction with the accompanying drawings, in which:

FIG. 5 is an illustration of a block diagram of a vibration sensor system;

FIG. 6 is an illustration of a flow diagram of an example movement sensor method;

FIG. 8 is an illustration of a diagram of an example radiation sensor method;

DETAILED DESCRIPTION

Figure 1:
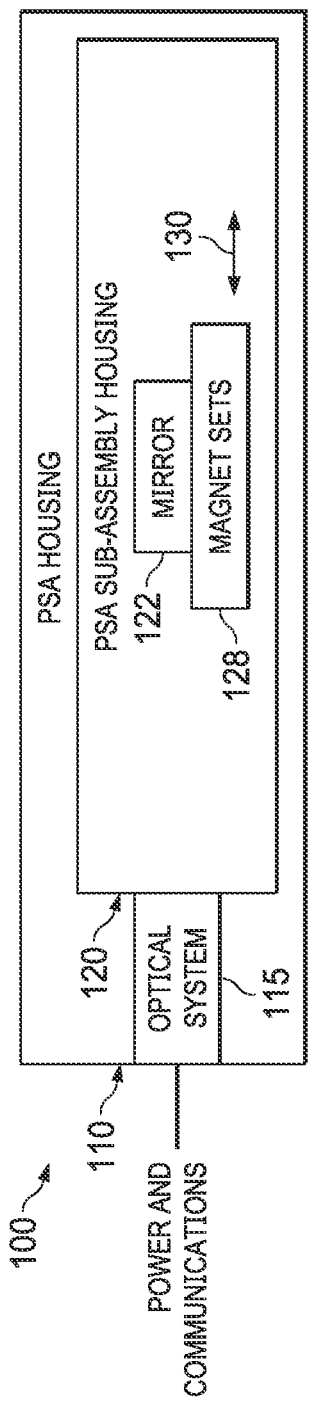
FIG. 1 is an illustration of a diagram of an example optical PSA apparatus utilizing a mirror.

In the hydrocarbon production industry, there can be one or more well site tools and well site equipment, i.e., well site tools, to support a well system. The well systems can be of various types and be at various stages of completion, such as logging while drilling (LWD), measure while drilling (MWD), hydraulic fracturing (HF), injection, and completion well systems. Some well site tools, which include downhole tools and bottom hole assemblies (BHA), can include parts that move, for example, a fluid control valve assembly, a centralizer arm (such as for wireline and MWD well systems), a bent sub (such as angle extensions and extenders), a fluid injector (such as for wireline, MWD, and completion well systems), a setting tool (such as for completion well systems), and a shifting tool (such as for wireline and completion well systems).

The well site tools can be moved, such as lowered into a borehole or otherwise positioned in and around the well system. Moving mechanisms of well site tools are the parts of the tools that can move relative to non-moving parts of the well site tools, such as fluid valves that are part of fluid control assemblies and actuator arms that are part of centralizer arms. For demonstration of this disclosure, moving mechanisms that utilize linear movement are considered. Those skilled in the art will understand that the disclosure is equally well suited for use in moving mechanisms that utilize rotational movement.

The movement of the moving mechanisms may need a certain level of precision and verification. Conventionally, a position sensor, i.e., a position sensor assembly (PSA), can be utilized to calculate the mechanism position of the moving mechanism, such as relative to a reference position, i.e., a calibration position. In addition, the PSA can be utilized to verify the mechanism position of the moving mechanism. For example, friction, a partial or full blockage, or another factor may prevent the moving mechanism moving to the position requested. Such requests can be initiated by a well site controller, a well site engineer or operator, or other well site systems.

Conventional PSAs may need a constant source of current or voltage to operate correctly, and a change in supplied electrical power may affect the accuracy. In addition, the PSA can experience variations in movement as compared to the moving mechanism. Typically, the PSA utilizes a magnetic system to couple with the moving mechanism, for example, coupling with a valve magnetic assembly (VMA) which in turn is coupled to a fluid control valve. The variations in movement can be due to the magnetic coupling between the PSA and the moving mechanism, as well as the mechanical forces that oppose a shift in direction of the PSA. The magnetic coupling is not rigid so when there is a direction shift, the magnetic force change can have a slow band or a dead band as the magnetic field flux lines are shifting direction. The magnetic field flux lines can also be affected by the air gap between the magnet sets, the size of the magnets, such as the outside diameter (OD) and lengths, and the size and position of the magnetic field flux spacers which direct and focus the flux lines. A mechanical force that resists the direction shift can be the friction force inside the PSA between the slider portion and the surfaces on the inside, stationary part, of the PSA housing.

The slow band, dead band, and the magnetic field flux lines can be influenced by the magnetic hysteresis factor of magnets. Magnetic hysteresis can be a primary concern as it can lead to a delay in movement of the PSA as compared to the movement of the moving mechanism. This can lead to incorrect or reduced accuracy of positioning data communicated to other well site tools.

To re-calibrate the PSA, the moving mechanism is often moved to a known position and the PSA is calibrated, for example, moving a fluid control valve to the fully closed position. Moving the moving mechanism to a known position can cost time and loss of operational accuracy, for example, more or less fluid may pass through a fluid control valve than intended during the calibration process and the movement to re-calibrate can cost increased operational time. As the well system operations are fine-tuned, and as different portions of the well site operational plan are implemented, changes to the moving mechanism can be frequent, so the re-calibration cost can increase over the time of the operational plan. Improvement, e.g., reduced cost and increased accuracy, to the well system operational plan can be achieved by moving the moving mechanism from the current position to the desired position without the need for frequent re-calibration.

This disclosure presents a position sensor apparatus and position sensor systems (collectively, position sensors) that replace conventional position sensors and PSAs to improve the responsiveness of the mechanism position measurements and verification of movement of the moving mechanisms. In one aspect, the PSA can be replaced by an optical-based PSA where the internal slider of the PSA is replaced by a mirror or an end of a fiber optic cable. The optical PSA can reduce internal friction and allow a reduction in magnet size since less magnetic force is required to move the mirror or fiber optic cable end compared to conventional slider mechanisms.

In a second aspect, the PSA is replaced by a vibration sensor, an accelerometer, or a combination thereof. In a third aspect, the PSA is replaced by a radiation source and detector that are attached to non-moving parts of the well site tool, and a moving radiation shield or lens that can block or diffuse a portion of the radiation emitted. The radiation shield or lens can alter the radiation parameters, such as altering the quantity of radiation detected, the intensity of the radiation detected, the wavelengths of the radiation received, i.e., wavelength shifting, diffusing the radiation, and altering other radiation parameters.

The improvements of the position sensors can be realized by allowing for the direct movement of the moving mechanism to a specified position rather than re-calibrating the moving mechanism prior to moving it to the specified position. The frequency of re-calibration actions can be reduced. For example, for fluid valve control assemblies, the reduction in time to move to the specified position can be 50% to 70% compared to conventional magnetic-based PSAs. In addition, the moving mechanism can move in either linear direction while minimizing the loss of position precision of the position sensor.

The position sensors can be self-calibrating or require a minimum frequency of calibration during systems integration testing with the moving mechanisms. In addition, in some aspects, couplings between moving mechanisms and position sensors can utilize non-magnetic methods resulting in an elimination of the magnetic hysteresis affect. The position sensors can also utilize fewer parts than existing PSAs while providing increased accuracy in position measurements.

Turning now to the figures, FIG. 1 is an illustration of a diagram of an example optical PSA apparatus 100 utilizing a mirror. Optical PSA apparatus 100 can replace a conventional PSA, while continuing to utilize the magnetic coupling with a moving mechanism, such as a VMA.

Optical PSA apparatus 100 includes a PSA housing 110, an optical system 115 that is included as part of PSA housing 110 and connected to power and a communication system, and a PSA sub-assembly housing 120. PSA sub-assembly housing 120 contains a PSA sub-assembly including a mirror 122 coupled to one or more magnet sets 128.

Optical system 115 can initiate optical radiation, such as from a laser, LED, OLED, and other types of optical sources. The optical radiation can be directed toward, and reflected by, mirror 122. The reflected optical radiation can then be detected by an optical detector located as part of optical system 115. The optical detector and other processing systems, such as a position calculator, can determine a time parameter of the reflected optical radiation, from a first time the optical radiation was emitted to a second time the reflected optical radiation was detected. In some aspects, an optical radiation intensity parameter can be detected.

The time parameter and the intensity parameter can be utilized to calculate the position of mirror 122 relative to optical system 115 and thereby a mechanism position of the moving mechanism can be computed. In some aspects, position calculator can be part of optical system 115, be proximate to optical system 115, or be a separate system from optical system 115. The time and intensity parameters, and the computed position information, can be communicated to one or more other well site tools, such as to a downhole tool, a BHA, surface well equipment of the well system, and other computer systems.

Mirror 122 can be a conventional mirror used for optical radiation reflection. Mirror 122 can reduce sliding friction experienced by the PSA sub-assembly, and therefore reduce the magnetic force required to move the PSA sub-assembly. The reduction in magnetic force can also reduce the experienced magnetic hysteresis. Mirror 122 is coupled to one or more magnet sets 128. Magnet sets 128 are magnetically coupled to the moving mechanism, such as the VMA. The linear directional movement of mirror 122 and coupled magnet sets 128 is shown by a double-headed arrow 130.

PSA sub-assembly housing 120 can be a vacuum or filled with a fluid, such as air, liquid, and other material. The fluid can be non-optically interactive. The fluid can provide pressure equalization, e.g., structural integrity, of the PSA sub-assembly housing 120 to resist dimpling, bowing, bending, constricting, and other physical deformations of PSA sub-assembly housing 120 due to the pressure exerted on PSA sub-assembly housing 120 from PSA housing 110 and the surrounding environment. In addition, the fluid can reduce friction experienced by mirror 122 and magnet sets 128 as they move linearly within PSA sub-assembly housing 120. The fluid can also dampen the movement of mirror 122 to improve accuracy by reducing vibration effects on mirror 122.

Figure 2A:
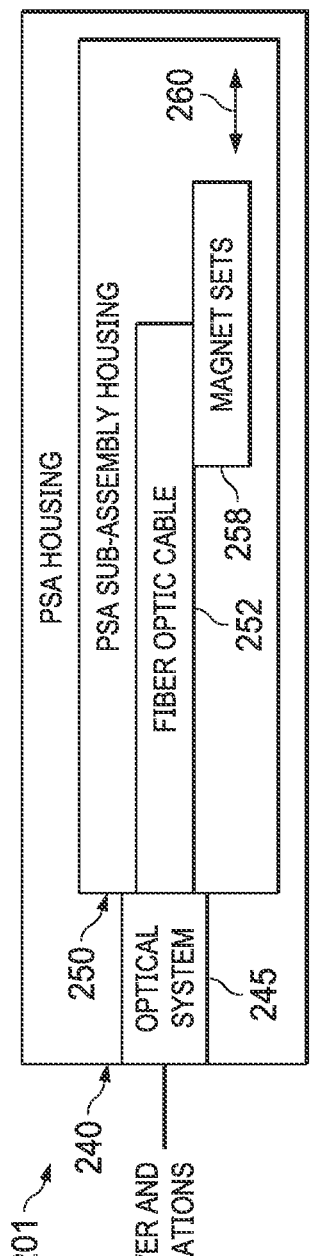
FIG. 2A is an illustration of a diagram of an example optical PSA apparatus utilizing a fiber optic cable.

FIG. 2A is an illustration of a diagram of an example optical PSA apparatus 201 utilizing a fiber optic cable. Optical PSA apparatus 201 is similar to optical PSA apparatus 100. Optical PSA apparatus 201 includes a PSA housing 240, an optical system 245 that is included with PSA housing 240 and that can be coupled to a power source and a communications system, and a PSA sub-assembly housing 250.

In place of mirror 122 of FIG. 1, the PSA sub-assembly within the PSA sub-assembly housing 250 includes a fiber optic cable 252. Fiber optic cable 252 has a first longitudinal end coupled physically and optically to optical system 245 of PSA housing 240. A second longitudinal end of fiber optic cable 252 is coupled to one or more magnet sets 258, which in turn, are magnetically coupled to the moving mechanism, such as the VMA. The second longitudinal end of fiber optic cable 252 moves linearly, as shown by a double-headed arrow 260.

As the second longitudinal end of fiber optic cable 252 moves, fiber optic cable 252 can be compressed into a wave form or extended toward a straight orientation (the straight orientation is shown). The optic radiation can be reflected by the second longitudinal end and by the internal reflections of fiber optic cable 252. The reflection types, e.g., reflectometry principles, can be utilized by optic system 245 to determine the time parameter and the intensity parameter. The other aspects of optical PSA apparatus 100 remain applicable to optical PSA apparatus 201.

Figure 2B:
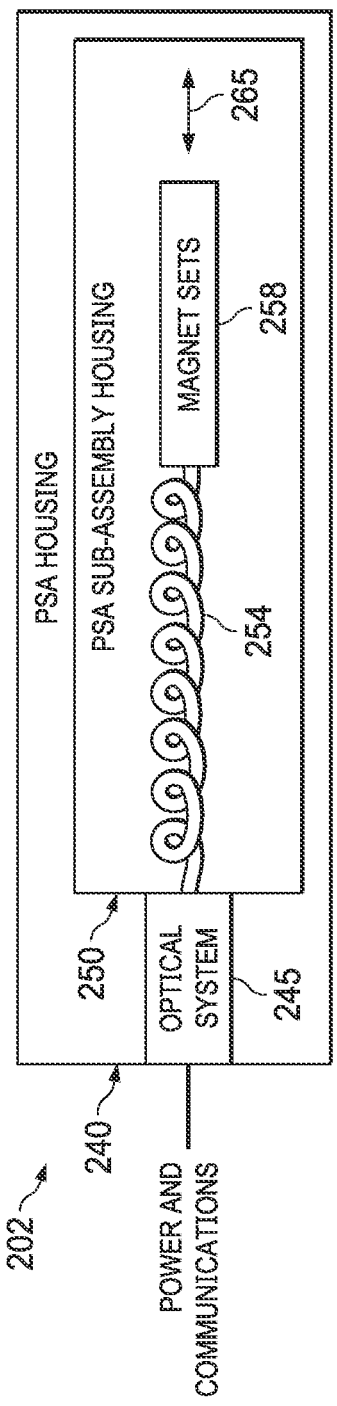
FIG. 2B is an illustration of a diagram of an example optical PSA apparatus utilizing a coiled fiber optic cable.

FIG. 2B is an illustration of a diagram of an example optical PSA apparatus 202 utilizing a coiled fiber optic cable. Optical PSA apparatus 202 is similar to optical PSA apparatus 100 and optical PSA apparatus 201. In place of fiber optic cable 252 in optical PSA apparatus 201, a coiled fiber optic cable 254 is used.

Optical system 245 or the position calculator can utilize the tightening and loosening of the curvature radius of the coils of coiled fiber optic cable 254 to determine the mechanism position of the moving mechanism. The second longitudinal end of coiled fiber optic cable 254 can move linearly as shown by double-headed arrow 265, causing the tightening and loosening of the curvature radius.

Figure 3:
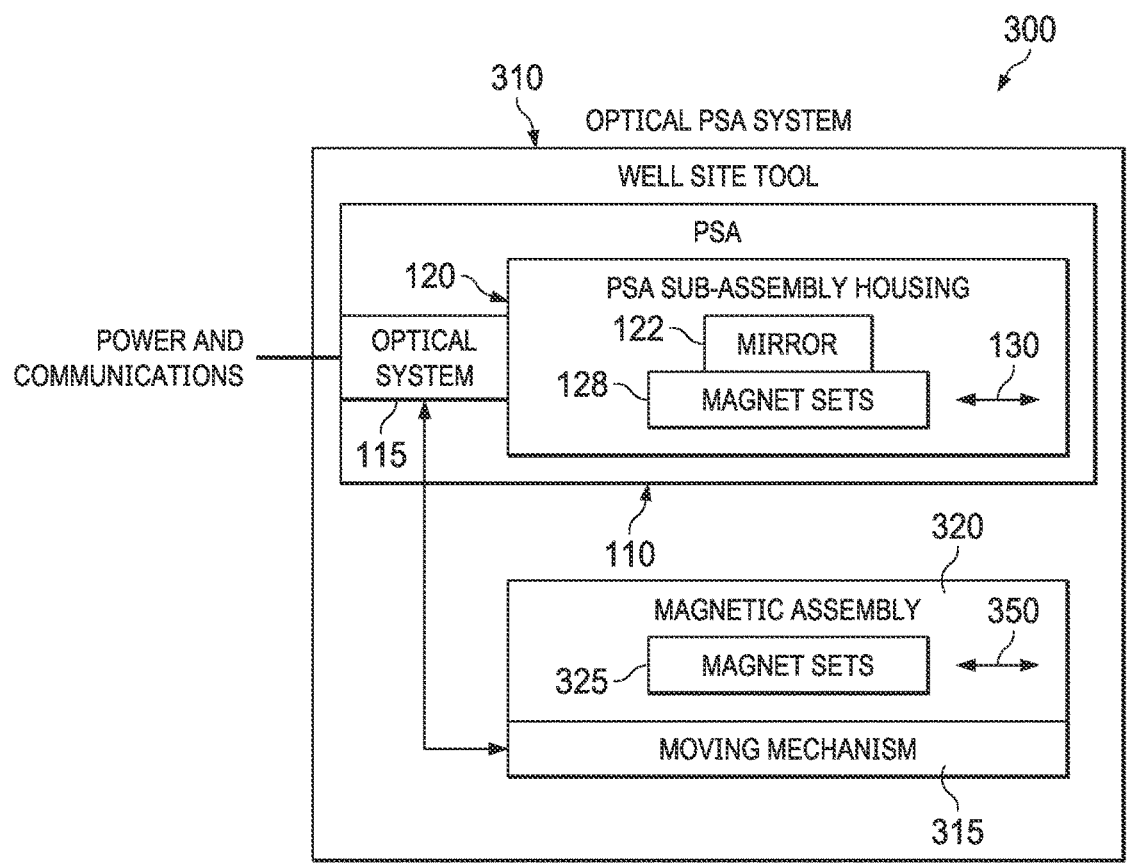
FIG. 3 is an illustration of a block diagram of an example optical PSA system using a mirror.

FIG. 3 is an illustration of a block diagram of an example optical PSA system 300 using a mirror. Optical PSA system 300 uses optical PSA apparatus 100 as shown in FIG. 1 as an example position sensor to demonstrate the system integration. Optical PSA system 300 includes a well site tool 310, such as surface well equipment, a downhole tool, a BHA, a fluid control valve assembly, and other types of well site tools. Well site tool 310 includes a moving mechanism 315, (for example, a fluid valve coupled to a fluid pipe), a magnetic assembly 320 (for example, a VMA), and PSA 110.

PSA 110 includes optical system 115 capable of generating and detecting reflected optic radiation, by receiving power from the well site tool or from other systems, and communicating the time parameter, intensity parameter, and position data to moving mechanism 315, well site tool 310, and other well site systems, such as a surface well site controller. PSA 110 also includes PSA sub-assembly housing 120 with mirror 122 and one or more coupled magnet sets 128.

Magnetic assembly 320 includes one or more magnet sets 325. As moving mechanism 315 moves, magnetic assembly 320 moves linearly as shown by double-headed arrow 350. Magnetically coupled to magnetic assembly 320 is magnet sets 128. As magnetic assembly 320 moves linearly, magnet sets 128 move linearly in conjunction, as shown by double-headed arrow 130. Using optical PSA system 300 can allow tools, such as a fluid valve, to have its position measured and verified by optical PSA apparatus 100.

Figure 4:
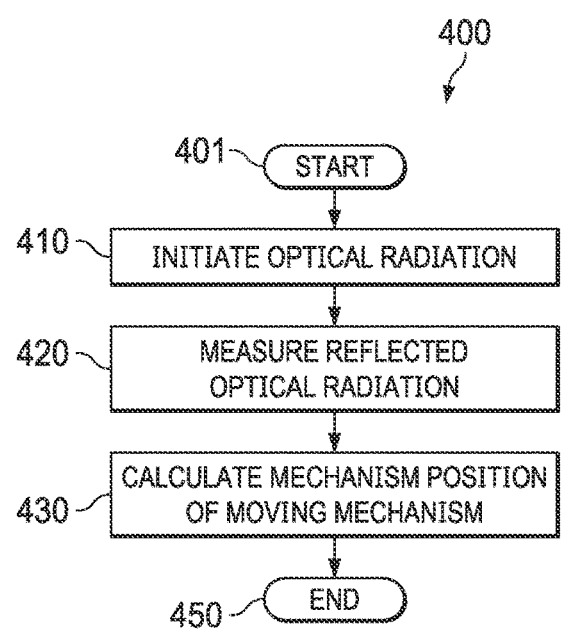
FIG. 4 is an illustration of a flow diagram of an example optical PSA method.

FIG. 4 is an illustration of a flow diagram of an example optical PSA method 400. Optical PSA method 400 calculates a mechanism position of a moving mechanism of a well site tool of a well system. Optical PSA method 400 can be carried out by a PSA capable of initiating and detecting reflected optical radiation, for example, optical PSA apparatus 100, 201, and 202 as shown in respective FIGS. 1, 2A, and 2B.

Optical PSA method 400 starts at a step 401 and proceeds to a step 410 where the optical radiation is initiated within a PSA housing. The optical radiation can be one or more of a laser, a LED, an OLED, and other optical sources. The optical radiation is reflected to an optical detector. The reflection can be initiated by a PSA sub-assembly contained within the PSA housing, for example, by a mirror, an end of a fiber optic cable, or by the internal reflections of a curved fiber optic cable. The PSA sub-assembly is coupled to a moving mechanism and as the moving mechanism moves, the PSA sub-assembly moves proportional to the linear movement.

Proceeding to a step 420, a detector can measure the optical radiation as reflected by the PSA sub-assembly. The detector can detect an elapsed time parameter for the optical radiation to be detected from the time it was initiated, and it can detect an intensity parameter of the optical radiation, where the intensity changes due to the length of time of travel.

Proceeding to a step 430, the mechanism position of the moving mechanism can be calculated relative to a calibration position, for example, for a fluid valve, the calibration position can be the fully closed valve position. The calculations can be performed within the PSA housing, such as by a position calculator. In other aspects, the elapsed time and intensity parameters can be communicated to the moving mechanism, the well site tool, and to other well site tools. The position calculator can be located in one or more of these other systems. Optical PSA method 400 ends at a step 450.

FIG. 5 is an illustration of a block diagram of a vibration sensor system 500. Vibration sensor system 500 can be used to measure and verify the mechanism position of a moving mechanism using detected frequency of vibrations, for example, caused by the flow of borehole fluid over a moving mechanism. Vibration sensor system 500 includes a fluid pipe 510 and a fluid valve control assembly 512. Fluid pipe 510 can be connected to a fluid pump system, such as surface pump equipment. Fluid pipe 510 can provide for an outflow of fluid, such as slurrys, muds, oil-based fluids, water-based fluids, and other borehole fluids, and can provide for an inflow of fluid, such as the borehole fluids, and oil, gas, and other hydrocarbons.

Fluid valve control assembly 512 can include a fluid valve capable of opening and closing to allow varying flow rates of the fluid into or out of the fluid pipe. The fluid valve is the moving mechanism for this example. Attached to the fluid valve is one or more of a vibration sensor 520, such as a micro-electric mechanical system (MEMS), and an accelerometer 522. In an alternative aspect, vibration sensor 520 can be attached to a non-moving part of fluid valve control assembly 512, proximate the fluid valve to be able to pick up the fluid valve vibrations.

As fluid flows past the fluid valve, the vibration frequencies caused by the fluid flow can be detected and measured by vibration sensor 520. In this example, fluid flows 515 are flowing out the fluid valve and fluid flows 517 are causing vibrations against the fluid valve that can be measured. The vibration frequencies can be utilized to compute the position of the fluid valve. The vibration frequencies can be calibrated to the flow of fluids, such as flow rates, by using laboratory tests and mathematical models. Vibration frequencies are consistent for varying fluid compositions, while the amplitude of the vibrations may differ for varying fluid compositions. Fluid valve component harmonics can also be used to determine the position of fluid valve.

Accelerometer 522 can measure the movement of the fluid valve and use that detected movement to compute the position of the fluid valve. The position is relative to a calibration position, such as the fluid valve at the fully closed position. In some aspects, accelerometer 522 and vibration sensor 520 can be combined within the same sensor.

The use of vibration sensor 520 and accelerometer 522 allows for the fluid valve control assembly 512 to operate without a PSA and without a VMA, thereby reducing mechanical parts and reducing operational costs. A combination using both vibration sensor 520 and accelerometer 522 can provide an additional check and verification on the position of the fluid valve. Similar to optical PSA system 300, vibration sensor system 500 can include a position calculator with vibration sensor 520, accelerometer 522, fluid valve control assembly 512, or with other well site tools, such as a well site controller or other downhole tools. The position calculator can receive the vibration frequency and the accelerometer parameters, compute a position of the fluid valve, and communicate the position information to one or more well site tools.

FIG. 6 is an illustration of a flow diagram of an example movement sensor method 600. Movement sensor method 600 calculates a mechanism position of a moving mechanism of a well site tool of a well system using vibrations or accelerations of the moving mechanism. Movement sensor method 600 can be carried out by a position sensor capable of detecting vibrations or accelerations of the moving mechanism in conjunction with a position calculator, for example, the vibration sensor system 500 as shown in FIG. 5.

Movement sensor method 600 starts at a step 601 and proceeds to a step 610 where a moving mechanism, such as a fluid valve is opened initiating fluid flow through the valve opening. The fluid can flow into a fluid control assembly from the borehole or flow out of the fluid control assembly from a fluid pipe.

In a step 620, a sensor can be used to measure a data parameter of the moving mechanism. For example, when the sensor is a vibration sensor, the frequency of vibration of the fluid valve (the data parameter), caused as the fluid flows past the fluid valve, can be measured, such as using a MEMS. The type of fluid that flows past the fluid valve may affect the amplitude of the vibrations detected, while the frequency can remain unaffected by the fluid composition. This allows the frequency of the vibrations to be used to calculate the fluid valve position. In an alternate aspect, an accelerometer can be used as the sensor and the movement of the fluid valve can be measured independently of the flow of fluids. The accelerometer can measure the movement and direction of the fluid valve over a time interval (the data parameter), e.g., the acceleration in a direction over a time interval.

In a step 630, the frequency of the vibrations, as detected in step 620 can be utilized to calculate the position of the fluid valve. The correspondence of frequency to valve fluid position can be determined in a laboratory environment or in another environment. In an alternate aspect, when an accelerometer is utilized, the movement and direction of the fluid valve, as detected in step 620, can be used to determine the current position of the fluid valve.

A position calculator can be used to calculate the fluid valve position. The position calculator can use the last known calibration position as the starting point for the calculations. For example, for the accelerometer aspect, the detected movements can be applied to the calibration position, such as a fully closed fluid valve, to calculate the current fluid valve position. The position calculator can be part of the vibration sensor or accelerometer, can be proximate the vibration sensor or accelerometer, or be part of other well site tools, such as the fluid control assembly or a well site controller. The position information from step 620 and step 630 can be communicated to other well systems, for example, the fluid control valve assembly, downhole tools, BHA, well site controllers, and other well site tools. The vibration sensor method 600 ends at a step 650.

Figure 7A:
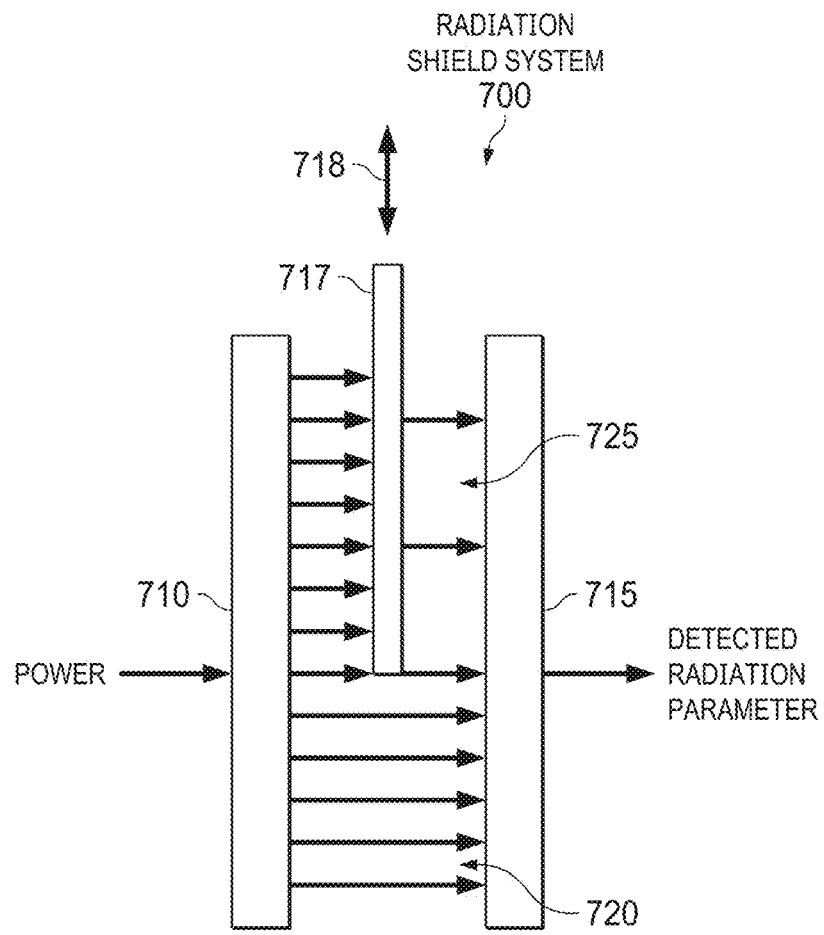
FIG. 7A is an illustration of a diagram of an example radiation shield system.

FIG. 7A is an illustration of a diagram of an example radiation shield system 700. Radiation shield system 700 can be utilized to measure the movement of a moving mechanism which is a part of a well site tool. Radiation shield system 700 includes a radiation source 710, a movement sensor 715 which is a radiation detector, and a radiation modifier 717.

Radiation source 710 can be one or more of various types of powered or non-powered radiation sources, such as gamma, x-ray, alpha, beta, light spectrum, and other radiation wavelengths. In aspects using powered radiation sources, radiation source 710 can receive power, such as from a power system capable of controlling and delivering power to the radiation source. Radiation 720 emitted by radiation source 710 can be directed toward movement sensor 715. Movement sensor 715 can detect radiation 720 that is received and determine the quantity, intensity, wavelength shift, and other parameters of radiation 720, and then communicate such parameters. Radiation source 710 and movement sensor 715 can be attached to non-moving parts of the well site tool, such as, respectively, on a first side and an opposite second side of the moving mechanism.

Radiation modifier 717, such as a radiation shield, is positioned to allow movement, to varying extents, between radiation source 710 and movement sensor 715, as shown by double-headed arrow 718, and can alter the radiation parameters as detected by movement sensor 715. As radiation modifier 717 moves outward from radiation source 710 and movement sensor 715, the blocking or shielding of radiation 720 is reduced. Movement in the opposite direction can cause an increase in the quantity of radiation 720 that is blocked or shielded.

Radiation modifier 717 can be coupled to the moving mechanism directly. In an alternate aspect, radiation modifier 717 can be indirectly coupled using one or more movement reducers, such as a reduction gear system, to reduce the movement of the moving mechanism as experienced by radiation modifier 717. The movement reducer can have a first end coupled to the moving mechanism and a second end coupled to radiation modifier 717. The movement reducer can allow the size of the radiation shield system 700 to be proportionately reduced in size.

As the moving mechanism moves, the radiation modifier 717 moves proportionately using linear motion, where the proportionality can utilize the optional movement reducers. The quantity of radiation 720 that is shielded, blocked, or otherwise reduced such as when the radiation is partially blocked, as shown by radiation 725, can be detected by movement sensor 715. Therefore, the quantity of radiation 720 detected can be utilized to calculate the mechanism position of the moving mechanism.

Figure 7B:
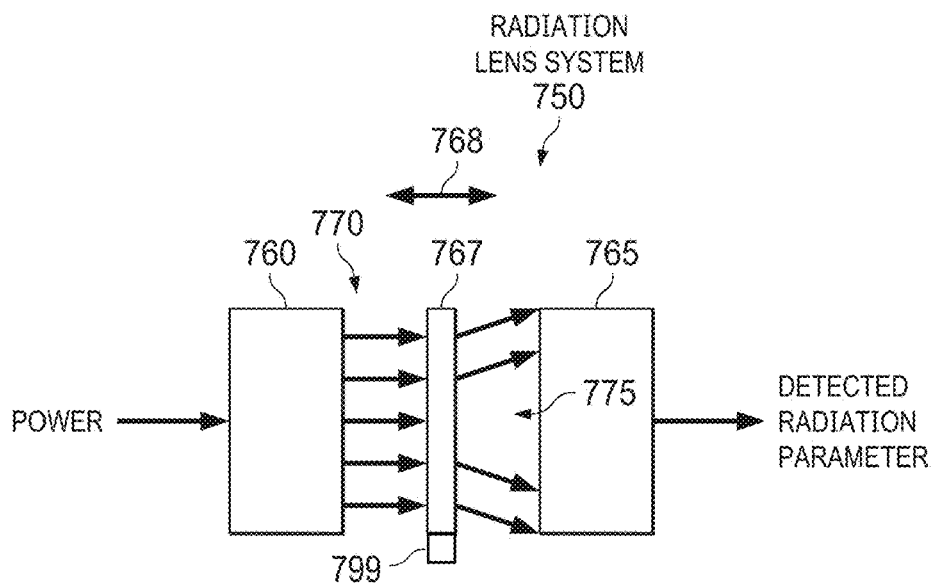
FIG. 7B is an illustration of a diagram of an example radiation lens system.

FIG. 7B is an illustration of a diagram of an example radiation lens system 750. Radiation lens system 750 is similar to radiation shield system 700, with differences where the movement sensor detects a diffusion of radiation and an alternate movement orientation is utilized for the radiation modifier. Radiation lens system 750 includes a radiation source 760, a movement sensor 765 which is a radiation detector, and a radiation modifier 767.

Radiation source 760 can be one or more of various types of powered or non-powered radiation sources, such as gamma, x-ray, alpha, beta, light spectrum, and other radiation wavelengths. In aspects using powered radiation sources, radiation source 760 can receive power, such as from a power system capable of controlling and delivering power to the radiation source. Radiation 770 emitted by radiation source 760 can be directed toward movement sensor 765. Movement sensor 765 can detect radiation 770 that is received and determine the diffusivity, quantity, intensity, shift, and other parameters of radiation 770, and then communicate such parameters. Radiation source 760 and movement sensor 765 can be attached to non-moving parts of the well site tool, such as, respectively, on a first side and an opposite second side of the moving mechanism.

Radiation modifier 767, such as one or more radiation lenses, is positioned to allow movement, to varying extents, between radiation source 760 and movement sensor 765, as shown by double-headed arrow 768, and can alter the radiation parameters as detected by movement sensor 765. As radiation modifier 767 moves toward radiation source 760, radiation modifier 767 can increase the alteration of radiation 770, as radiation 770 passes through the one or more radiation lenses; for example, radiation 770 can become more diffuse at movement sensor 765. Movement in the opposite direction can cause radiation 770 to become less diffuse as radiation 770 has a shorter path to movement sensor 765 from radiation modifier 767 where the one or more radiation lenses have less alteration affect.

Radiation modifier 767 can be coupled to the moving mechanism directly. In an alternate aspect, radiation modifier 767 can be indirectly coupled using one or more movement reducers, such as a reduction gear system 799, to reduce the movement of the moving mechanism as experienced by radiation modifier 767. The movement reducer can have a first end coupled to the moving mechanism and a second end coupled to radiation modifier 767. The movement reducer can allow the size of radiation lens system 750 to be proportionately reduced in size as well.

As the moving mechanism moves, radiation modifier 767 moves proportionately using linear motion, where the proportionality utilizes the movement reducers. The quantity of radiation 770 that is diffused, as shown by radiation 775, can be detected by movement sensor 765. Therefore, the quantity, diffusivity, wavelength shift, and other radiation parameters of radiation 770 detected can be utilized to calculate the mechanism position of the moving mechanism.

Radiation shield system 700 and radiation lens system 750 can be sized similarly to conventional PSAs, for example, approximately three-eighths to one inch high and wide (approximately 0.9525 centimeters to 2.54 centimeters), and ten inches (approximately 25.4 centimeters) overall length. The use of movement reducers can reduce the length, for example, to six inches (approximately 15.24 centimeters). Similar to other aspects of this disclosure, a position calculator can be part of or proximate to the respective radiation shield system 700 and radiation lens system 750. In other aspects, the position calculator can be located in other systems, for example, a downhole tool, a BHA, or a well site controller. The position calculator can receive the detected radiation parameter and utilize it to calculate a mechanism position of the moving mechanism. The position calculator can utilize a calibration position in determining the mechanism position of the moving mechanism.

FIG. 8 is an illustration of a diagram of an example radiation sensor method 800. Radiation sensor method 800 calculates a mechanism position of a moving mechanism of a well site tool of a well system using detected radiation parameters, such as quantity, diffusivity, intensity, wavelength shift, and other radiation parameters. Radiation sensor method 800 can be carried out by a sensor system capable of detecting altered radiation, where the altering is proportionately affected by the moving mechanism, in conjunction with a position calculator, for example, radiation shield system 700 as shown in FIG. 7A and radiation lens system 750 as shown in FIG. 7B.

Radiation sensor method 800 starts at a step 801 and proceeds to a step 810 where a radiation emission is initiated, such as applying power to a radiation source. The radiation source is attached to a first location of a non-moving part of the well site tool. The radiation source can be one or more of various types of powered or non-powered radiation sources, such as gamma, x-ray, alpha, beta, light spectrum, and other radiation wave lengths.

In step 820, the moving mechanism is moved. Coupled to the moving mechanism is a radiation shield or lens. As the moving mechanism moves, the radiation shield or lens moves proportionately using linear motion with the moving mechanism and the quantity of radiation altered changes with the movement. The radiation shield or lens can cause the emitted radiation to be blocked, partially blocked, or diffused, i.e., alter the radiation as compared to the radiation emitted.

In a step 830, the altered radiation can be detected and various parameters can be measured, such as the quantity, intensity, diffusivity, wavelength shift, and other radiation parameters. A radiation detector can be used to detect the radiation, and the radiation detector is attached to a second location of a non-moving part of the well site tool.

In a step 840, the mechanism position of the moving mechanism can be calculated, such as using a position calculator, where the position is calculated using a calibration position and the radiation parameters detected in step 830. Radiation sensor method 800 ends at a step 870.

Figure 9A:
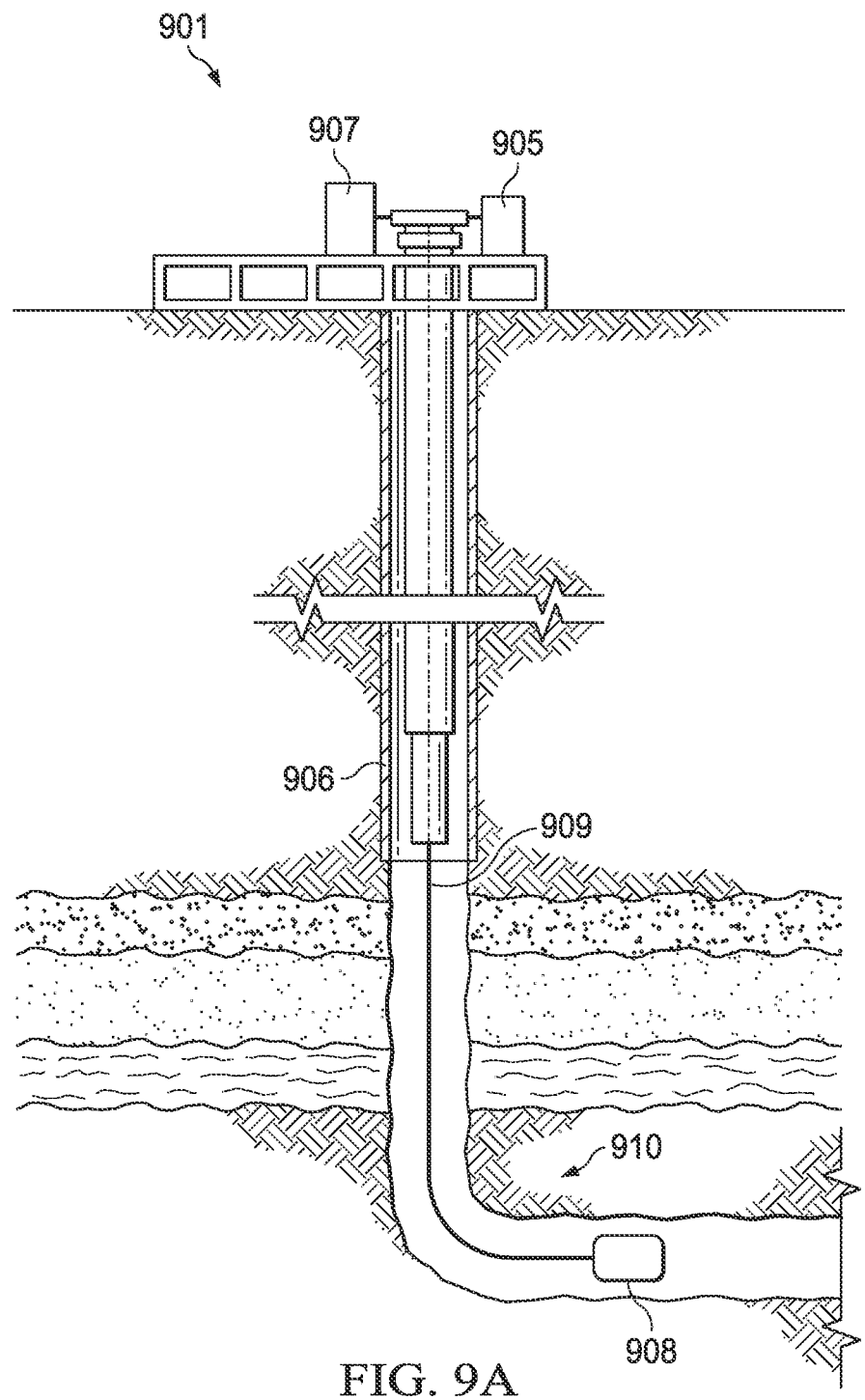
FIG. 9A is an illustration of a diagram of an example completion system.

FIG. 9A is an illustration of a diagram of an example completion system 901. Completion system 901 includes a pump system 905 and a well site controller 907. Well site controller 907 includes a processor and a memory and is configured to direct at least some operations of completion system 901. Extending below pump system 905 is a borehole 906 surrounded by subterranean formation 910. Tool pipe 909 is inserted into borehole 906. Located within borehole 906 is a fluid injection system 908.

Fluid injection system 908 further includes a VMA coupled to the fluid valve and a PSA sub-assembly magnetically coupled to the VMA, for example, optical PSA system 300 as shown in FIG. 3, and can be utilized to determine the amount the fluid valve is opened, as well as to measure the fluid volume moved within a tool or moved into and out of the tool. In other aspects, fluid injection system 908 can be replaced by a moving mechanism that can benefit from position monitoring. For example, a moving mechanism that can benefit from monitoring and verifying positions can be a centralizer arm (such as for wireline and MWD systems), a bent sub (such as angle extensions and extenders), a fluid injector (such as for wireline, MWD, and completion systems), a setting tool (such as for completion systems), and a shifting tool (such as for wireline and completion systems).

Figure 9B:
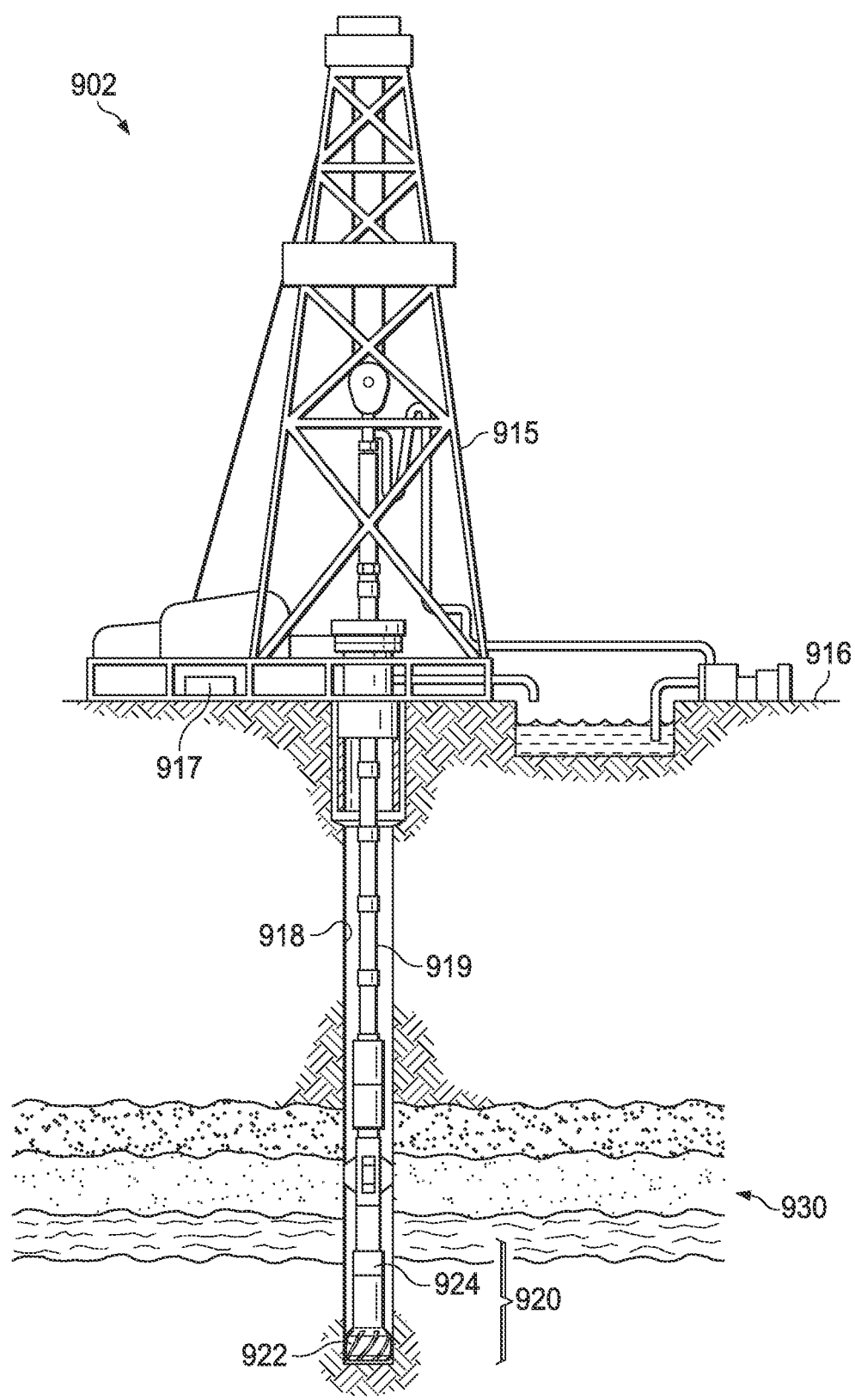
FIG. 9B is an illustration of a diagram of an example drilling well system.

FIG. 9B is an illustration of a diagram of an example drilling system 902, which can be a LWD, MWD, or other type of well system. Drilling system 902 includes a derrick 915 supporting drill string 919, and well site controller 917. Well site controller 917 includes a processor and a memory and is configured to direct operation of drilling system 902. Derrick 915 is located at a surface 916. Extending below derrick 915 is borehole 918 in which drill string 919 is inserted, where borehole 918 is surrounded by subterranean formation 930. Located at the bottom of drill string 919 is a downhole tool 920. Downhole tool 920 can include various downhole tools and BHA, a drill bit 922, and a fluid control valve system 924.

In this example, fluid control valve system 924 is a well site tool with a moving mechanism specified as a fluid valve. Fluid control valve system 924 includes a control valve fluidly coupled with a fluid pipe, a VMA coupled to the fluid valve, an optical PSA coupled to the fluid control valve assembly, and a transceiver. The optical PSA includes an PSA sub-assembly which is magnetically coupled to the VMA. Other components of fluid control valve system 924 can be present, such as a local power supply, or batteries and capacitors to store power received from another system. Fluid control valve system 924 can be used as an outflow, such as when a drilling mud or an injection fluid are being released into the borehole, or an inflow, such as when drilling mud or hydrocarbons are being extracted from the borehole.

The VMA has a linear movement associated with the amount the fluid valve is opened, where the fluid valve can be between, including the end points, fully closed and fully opened. The VMA moves proportionally, using linear movement, to the amount the fluid value is opened. The new position information can be communicated to one or more systems, for example, to the fluid control valve assembly to stop the movement of the fluid valve at the selected position, and to well site controller 917. Well site operators or engineers can then verify the amount the fluid valve is opened.

As the VMA moves, the PSA sub-assembly is moved as well due to the magnetic force exerted on the PSA sub-assembly. The optical PSA can indicate the linear position and determine the relative amount the fluid valve is opened using calibration parameters. In addition, the optical PSA can be used to measure the fluid volume moved within a tool or moved into and out of the tool. The optical PSA can be calibrated by moving the fluid valve to the fully closed position and then calibrating the optical PSA at that position. Well site controller 917 or well site operators or engineers, using the received data, can modify the well system job plan and further modify the amount the fluid valve is opened.

In an alternate aspect, the VMA, optical PSA, and PSA sub-assembly can be replaced by a vibration sensor, an accelerometer sensor, or a radiation detector system. As the fluid valve moves, the movement or the position of the fluid valve can be measured using one or more of the sensors and systems. The measured movement can be used to calculate the fluid valve position or the measured movement can be communicated to other well site tools for processing.

Figure 9C:
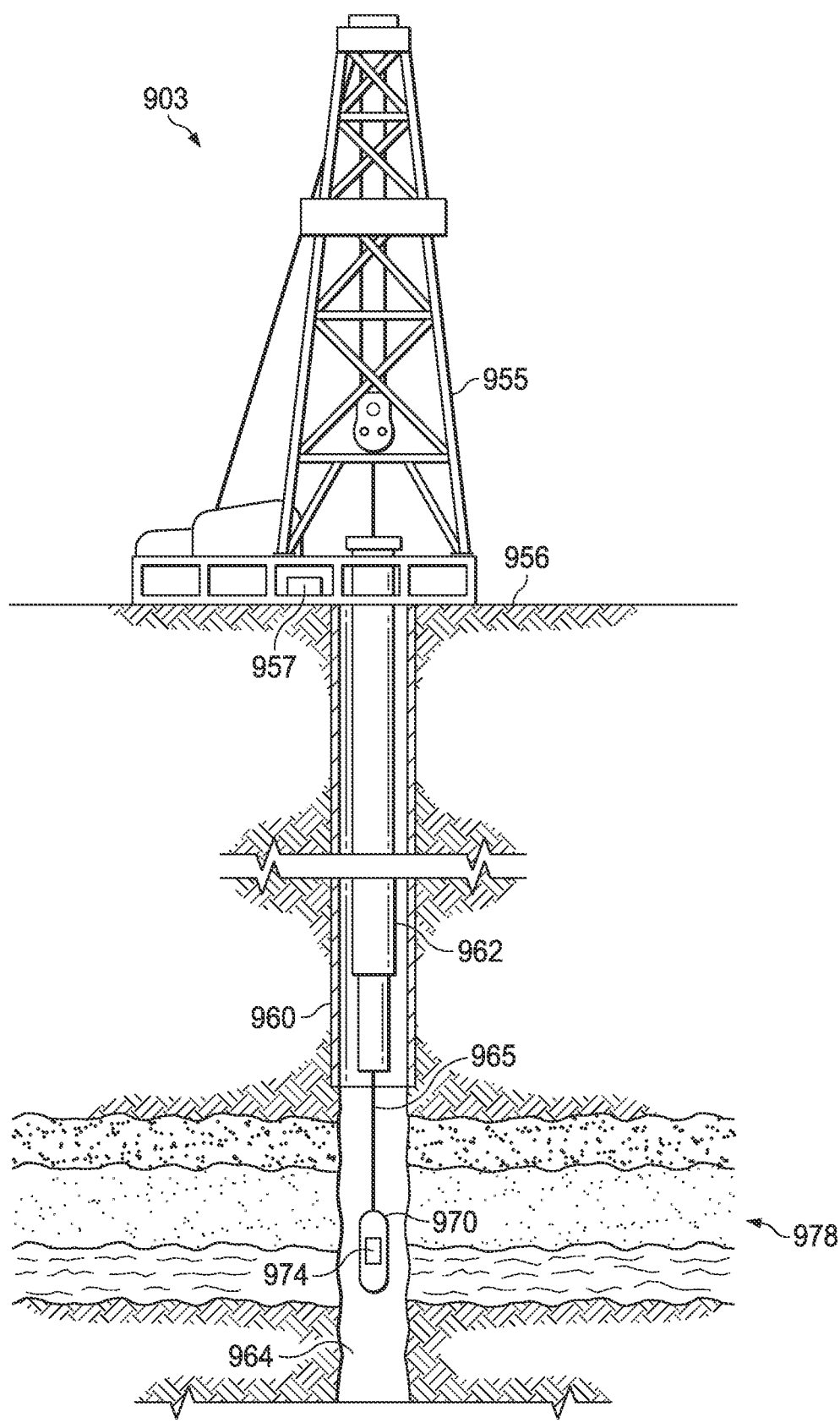
FIG. 9C is an illustration of a diagram of an example logging system.

FIG. 9C is an illustration of a diagram of an example logging system 903. Logging system 903 includes derrick 955 and well site controller 957. Derrick 955 is located at surface 956. Well site controller 957 includes a processor and a memory and is configured to direct operation of logging system 903. Below derrick 955 is borehole 960 that has two cased sections 962 and one uncased section 964, where borehole 960 is surrounded by subterranean formation 978. A wireline 965 is suspended in borehole 960 from derrick 955. A winch (not shown) can cooperate with the derrick 955 for lowering and raising of the wireline 965 in the borehole 960. At the lower end of wireline 965 are downhole tools 970 and a well site tool 974 that includes a moving mechanism. In some aspects, well site tool 974 can be downhole tools 970.

Similar to FIG. 9B, well site tool 974 further includes one or more of an optical PSA, a vibration sensor, an accelerometer, and a radiation detector, and can determine the movement of the moving mechanism part of well site tool 974. The results can be communicated to other systems.

A fluid valve with an optical PSA was used for example in FIGS. 9A, 9B, and 9C. The well site tool can be various well site tools that have a moving mechanism and the position sensor can be one or more of the described position sensors herein, for example, optical PSA apparatus 201, optical apparatus 202, optical PSA system 300, vibration sensor system 500, radiation shield system 700, and radiation lens system 750. Although FIGS. 9A, 9B, and 9C depict specific borehole configurations, those skilled in the art will understand that the disclosure is equally well suited for use in boreholes having other orientations including vertical boreholes, horizontal boreholes, slanted boreholes, multilateral boreholes, and other borehole types. FIGS. 9A, 9B, and 9C depict an onshore operation. Those skilled in the art will understand that the disclosure is equally well suited for use in offshore operations or production well systems.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

Aspects disclosed herein include:

A. An apparatus to calculate a mechanism position of a moving mechanism of a well site tool in a well system, including: (1) a PSA housing capable to produce optical radiation, and to detect a reflection of the optical radiation, and (2) a PSA sub-assembly, magnetically coupled to the moving mechanism and capable to reflect the optical radiation.

B. A method to calculate a mechanism position of a moving mechanism of a well site tool in a well system, including: (1) initiating an optical radiation generated in a PSA housing, (2) measuring a reflected optical radiation as reflected by a PSA sub-assembly wherein the PSA sub-assembly is coupled to and moves proportionally to the moving mechanism, and (3) calculating, using the measuring, the mechanism position of the moving mechanism relative to a calibration position.

C. A system to calculate a mechanism position of a moving mechanism of a well site tool in a well system, including: (1) a position calculator, capable to calculate the mechanism position of the moving mechanism relative to a calibration position utilizing a movement measurement of the moving mechanism, and (2) a movement sensor, capable to communicate with the position calculator and to obtain the movement measurement utilizing one or more of a vibration sensor, an accelerometer, and a radiation detector.

D. A method to calculate a mechanism position of a fluid valve of a well site tool in a well system, including: (1) initiating a fluid flow through the fluid valve, wherein a sensor is attached to the fluid valve, (2) measuring a data parameter using the sensor, and (3) calculating the mechanism position of the fluid valve relative to a calibration position using the measuring, wherein the sensor is one or more of a vibration sensor and an accelerometer, and the data parameter is one or more of a frequency of vibration, a time interval, and an acceleration.

E. A method to calculate a mechanism position of a moving mechanism of a well site tool in a well system, including: (1) initiating radiation generated by a radiation source, wherein the radiation source is attached to a non-moving part of the well site tool proximate a first side of the moving mechanism, (2) altering the radiation using a radiation modifier that is coupled to the moving mechanism, (3) measuring the radiation received at a radiation detector, wherein the radiation detector is attached to a non-moving part of the well site tool proximate a second side of the moving mechanism, and (4) calculating the mechanism position of the moving mechanism relative to a calibration position using the measuring.

Each of aspects A, B, C, D, and E can have one or more of the following additional elements in combination: Element 1: wherein the PSA sub-assembly includes a mirror. Element 2: wherein the PSA sub-assembly includes a fiber optic cable, a first longitudinal end of the fiber optic cable is coupled to the PSA housing and a second longitudinal end of the fiber optic cable is magnetically coupled to the moving mechanism. Element 3: wherein the fiber optic cable is coiled. Element 4: wherein the PSA housing is filled with a non-optically interactive fluid. Element 5: further comprising a position calculator capable to calculate the mechanism position by utilizing one or more of a time parameter and an intensity parameter of the optical radiation, as measured from a first time of emitting the optical radiation to a second time of detecting the reflected optical radiation. Element 6: wherein the position calculator is capable to calculate the mechanism position of the moving mechanism relative to a calibration position utilizing the reflected optical radiation. Element 7: further comprising a communicator, capable to communicate the time parameter and the intensity parameter to one or more downhole tools and surface well equipment of the well system. Element 8: wherein the moving mechanism is a part of one of a valve magnetic assembly, a fluid valve assembly, a centralizer arm, a bent sub, a fluid injector, a setting tool, and a shifting tool. Element 9: wherein the measuring includes measuring one or more of a time parameter and an intensity parameter of the optical radiation, as measured from a first time of emitting the optical radiation to a second time of detecting the reflected optical radiation. Element 10: wherein the movement sensor is attached to the moving mechanism. Element 11: wherein the movement sensor is attached proximate the moving mechanism. Element 12: where the moving mechanism is a fluid control valve. Element 13: wherein the movement sensor is a MEMS. Element 14: further comprising a radiation source capable to emit radiation directed toward the movement sensor. Element 15: wherein the movement sensor is the radiation detector. Element 16: wherein the radiation source is attached to a first location of the well site tool and the radiation detector is attached to a second location of the well site tool. Element 17: further comprising a radiation modifier capable to alter the radiation. Element 18: wherein the radiation modifier is coupled to the moving mechanism. Element 19: wherein the radiation modifier is positioned between the radiation source and the radiation detector. Element 20: wherein the radiation source is one of a gamma radiation, an x-ray radiation, a beta radiation, an alpha radiation, and a light spectrum radiation. Element 21: wherein the radiation source is a non-powered radiation source. Element 22: wherein the radiation modifier is a radiation shield capable of partially blocking the radiation. Element 23: wherein the radiation modifier is a lens capable of diffusing the radiation. Element 24: further comprising a reduction gear system, a first end coupled to the moving mechanism and a second end coupled to the radiation modifier. Element 25: wherein the reduction gear system is capable to proportionally reduce the movement of the radiation modifier. Element 26: further comprising a power system, capable of controlling and delivering power to the radiation source. Element 27: wherein the position calculator is proximate the movement sensor. Element 28: wherein the position calculator is further capable to communicate the mechanism position to other well site tools. Element 29: wherein the well site tool is a first well site tool and the position calculator is located in a second well site tool. Element 30: wherein the position calculator is further capable to receive the measure of the movement of the moving mechanism from the movement sensor. Element 31: further comprising communicating the measuring and calculating to other well site tools in the well system. Element 32: wherein the measuring measures one or more of a radiation intensity parameter and a radiation diffusivity parameter.

What is claimed is:

1. A system to calculate a mechanism position of a moving mechanism of a well site tool in a well system, comprising:
   a position calculator, configured to calculate the mechanism position of the moving mechanism relative to a calibration position utilizing a movement measurement of the moving mechanism;
   a radiation detector, configured to communicate with the position calculator;
   a non-powered radiation source, configured to emit radiation directed toward the radiation detector, wherein the radiation source is attached to a first location of the well site tool and the radiation detector is attached to a second location of the well site tool, wherein the radiation is outside of the light spectrum; and
   a radiation shield coupled to the moving mechanism and configured to partially block the radiation directed toward the radiation detector, wherein the radiation shield is positioned between the radiation source and the radiation detector, and the radiation detector is configured to obtain the movement measurement utilizing radiation received thereat.

2. The system as recited in claim 1, wherein the moving mechanism is part of one of a centralizer arm, a bent sub, a fluid injector, a setting tool, or a shifting tool.

3. The system as recited in claim 1, wherein the movement sensor is attached proximate the moving mechanism, and where the moving mechanism is a fluid control valve.

4. The system as recited in claim 1, wherein the first location and the second location are at non-moving parts of the well site tool.

5. The system as recited in claim 1, wherein the position calculator is proximate the radiation detector, and is further configured to communicate the mechanism position to other well site tools.

6. The system as recited in claim 1, wherein the well site tool is a first well site tool and the position calculator is located in a second well site tool, and the position calculator is further configured to receive the movement measurement from the radiation detector.

7. The system as recited in claim 1, wherein the moving mechanism is a part of one of a valve magnetic assembly or a fluid valve assembly, a centralizer arm, a bent sub, a fluid injector, a setting tool, and a shifting tool.

8. The system as recited in claim 1, wherein the radiation shield moves perpendicular to the radiation source and the radiation detector.

9. The system as recited in claim 1, wherein the radiation shield moves linearly with the moving mechanism.

10. The system as recited in claim 1, wherein the movement measurement is a radiation parameter associated with the radiation detected by the radiation detector.

11. The system as recited in claim 1, wherein the radiation source is one of a gamma radiation or an x-ray radiation.

12. The system as recited in claim 1, wherein the radiation source is one of a beta radiation or an alpha radiation.

13. The system as recited in claim 1, further comprising:
a reduction gear system, a first end coupled to the moving mechanism and a second end coupled to the radiation shield, wherein the reduction gear system is configured to proportionally reduce the movement of the radiation shield.

14. The system as recited in claim 1, further comprising:
a power system, configured to control and deliver power to the radiation source.

15. A method to calculate a mechanism position of a moving mechanism of a well site tool in a well system, comprising:
initiating radiation generated by a non-powered radiation source configured to emit radiation directed toward a radiation detector, wherein the radiation source is attached to a first location of the well site tool and the radiation detector is attached to a second location of the well site tool, wherein the radiation is outside of the light spectrum;
altering the radiation using a radiation shield coupled to the moving mechanism and configured to partially block the radiation directed toward the radiation detector, wherein the radiation shield is positioned between the radiation source and the radiation detector;
measuring the radiation received at the radiation detector and obtaining a movement measurement of the moving mechanism utilizing the measured radiation; and
calculating the mechanism position of the moving mechanism relative to a calibration position using the movement measurement.

16. The method as recited in claim 15, wherein the measuring measures one or more of a radiation intensity parameter and a radiation diffusivity parameter.

17. The method as recited in claim 16, wherein the radiation shield moves linearly with the moving mechanism.

18. The method as recited in claim 16, wherein the movement measurement is a radiation parameter associated with the radiation detected by the radiation detector.

* * * * *